(12) United States Patent
Tamaddoni et al.

(10) Patent No.: US 12,091,475 B2
(45) Date of Patent: Sep. 17, 2024

(54) PROCESS FOR PREPARATION OF MULTIMODAL POLYOLEFIN

(71) Applicant: SABIC GLOBAL TECHNOLOGIES B.V., Bergen op Zoom (NL)

(72) Inventors: Maryam Tamaddoni, Maastricht (NL); Job Daniel Guzman-Carrazco, Amstelveen (NL); Maryam Khodadadian Miri, Roermond (NL); Francesco Bertola, Maastricht (NL); Andrei Merenov, Houston, TX (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 657 days.

(21) Appl. No.: 17/284,605

(22) PCT Filed: Sep. 12, 2019

(86) PCT No.: PCT/EP2019/074322
§ 371 (c)(1),
(2) Date: Apr. 12, 2021

(87) PCT Pub. No.: WO2020/078624
PCT Pub. Date: Apr. 23, 2020

(65) Prior Publication Data
US 2021/0388122 A1    Dec. 16, 2021

(30) Foreign Application Priority Data
Oct. 15, 2018    (EP) .................................... 18200310

(51) Int. Cl.
*C08F 210/16*    (2006.01)
*C08F 2/00*      (2006.01)
(Continued)

(52) U.S. Cl.
CPC ................ *C08F 2/001* (2013.01); *C08F 2/01* (2013.01); *C08F 2/14* (2013.01); *C08F 4/6555* (2013.01);
(Continued)

(58) Field of Classification Search
CPC .......... C08F 210/16; C08F 2/01; C08F 2/001; C08F 2500/05; C08F 2500/12; C08F 2500/07
See application file for complete search history.

(56) References Cited

U.S. PATENT DOCUMENTS

| 3,450,183 A | 6/1969 | Hinton |
| 6,225,421 B1 | 5/2001 | Promel et al. |

(Continued)

FOREIGN PATENT DOCUMENTS

| CN | 103387628 A | 5/2012 |
| EP | 1162211 A1 | 12/2001 |

(Continued)

OTHER PUBLICATIONS

International Search Report; International Application No. PCT/EP2019/074322; International Filing Date: Sep. 12, 2019; Date of Mailing: Nov. 20, 2019; 3 pages.

(Continued)

*Primary Examiner* — Rip A Lee
(74) *Attorney, Agent, or Firm* — CANTOR COLBURN LLP (57) ABSTRACT

The invention relates to a process for the preparation of a multimodal copolymer of ethylene and a comonomer which is 1-hexene and/or 1-butene in a series of polymerization reactors comprising at least a first polymerization reactor and a second polymerization reactor, the process comprising: a) feeding ethylene, hydrogen and catalyst components
(Continued)

(1) and a first diluent (29) to the first polymerization reactor (A) to prepare a first suspension (3) of solid particles of a first ethylene polymer in a first suspension medium, wherein the first diluent (29) comprises branched heptane and is essentially free of the comonomer: b) feeding the first suspension (3) to a flash drum (E) for vaporizing a part of the first suspension medium to obtain a hydrogen-depleted suspension (4), c) feeding the hydrogen-depleted suspension (4), ethylene and comonomer (9) and a second diluent (24 & 34) to the second polymerization reactor (H) to prepare a second suspension (11) of solid particles of a second ethylene polymer in a second suspension medium, wherein the second diluent (24 & 34) comprises branched heptane and the comonomer dissolved in the second diluent, d) processing the second suspension (11) to obtain a dry effluent (15) of the solid particles of the second ethylene polymer and a liquid stream (23) comprising branched heptane, the comonomer, and low molecular weight hydrocarbon reaction products, e) feeding at least part (25) of the liquid stream (23) to an evaporation system (Q) for separating non-volatile, low-molecular-weight hydrocarbon reaction products and subsequently to a distillation column (R) for separating the comonomer from branched heptane to obtain 1) a branched heptane liquid stream (29) essentially free of the comonomer. 2) a vapor distillate (31) comprising the comonomer and branched heptane and 3) a liquid distillate (30) comprising branched heptane and the comonomer, f) feeding the liquid distillate stream (30) to the second polymerization reactor (B) to form at least part of the second diluent (34) and g) feeding the branched heptane liquid stream (29) to the first polymerization reactor as the first diluent.

10 Claims, 1 Drawing Sheet

(51) Int. Cl.
*C08F 2/01* (2006.01)
*C08F 2/14* (2006.01)
*C08F 4/655* (2006.01)

(52) U.S. Cl.
CPC ........ *C08F 210/16* (2013.01); *C08F 2500/05* (2013.01); *C08F 2500/07* (2013.01); *C08F 2500/12* (2013.01)

(56) References Cited

U.S. PATENT DOCUMENTS

| | | | |
|---|---|---|---|
| 6,716,936 B1 | 4/2004 | McGrath et al. | |
| 6,924,340 B2 | 8/2005 | McGrath | |
| 8,557,932 B2 | 10/2013 | Meier et al. | |
| 9,051,458 B2 | 6/2015 | Berthold et al. | |
| 9,175,120 B2 | 11/2015 | Marissal et al. | |
| 10,696,826 B2 * | 6/2020 | Garg | C08F 210/16 |
| 11,001,649 B2 * | 5/2021 | Suchao-In | B01J 19/06 |
| 11,427,670 B2 * | 8/2022 | Roos | C08F 210/16 |
| 2003/0191251 A1 | 10/2003 | McGrath | |
| 2016/0369091 A1 | 12/2016 | Hjertberg et al. | |
| 2018/0208749 A1 * | 7/2018 | Garg | C08L 23/0815 |
| 2018/0273708 A1 | 9/2018 | Kikuchi | |
| 2021/0214473 A1 | 7/2021 | Guzman-Carrazco et al. | |
| 2021/0380737 A1 * | 12/2021 | Mure | F16L 9/12 |

FOREIGN PATENT DOCUMENTS

| | | | |
|---|---|---|---|
| EP | 3176213 A1 | 6/2017 | |
| WO | 2011076371 A1 | 6/2011 | |
| WO | 2015197558 A1 | 12/2015 | |
| WO | 2016188703 A1 | 12/2016 | |
| WO | 2018046712 A1 | 3/2018 | |
| WO | WO 2108/095772 A2 * | 5/2018 | C08L 23/04 |

OTHER PUBLICATIONS

Written Opinion; International Application No. PCT/EP2019/074322; International Filing Date: Sep. 12, 2019; Date of Mailing: Nov. 20, 2019; 10 pages.

Hexanes Material Safety Data Sheet MSDS # 326.00 (2 pages), 2008, Scholar Chemistry (Year: 2008).

* cited by examiner

PROCESS FOR PREPARATION OF MULTIMODAL POLYOLEFIN

CROSS REFERENCE TO RELATED APPLICATIONS

This application a national stage application of International Application No. PCT/EP2019/074322, filed Sep. 12, 2019, which claims priority to European Application No. 18200310.3, filed Oct. 15, 2018, both of which are incorporated by reference in their entirety.

TECHNICAL FIELD

The present invention relates to a process for the preparation of a multimodal polyolefin. The present invention further relates to a system for performing such process.

BACKGROUND

The production of polymer powder by polymerization reactions of monomers in the presence of catalysts is well-known. Commercial use of fluidized bed reactors and suspension polymerization reactors are known.

In a suspension polymerization reactor, the polymerization is conducted in a stirred tank or a continuous loop reactor in which a suspension of polymer particles in a suspension medium comprising a hydrocarbon diluent is circulated. During the course of polymerization, fresh polymer is generated by the catalytic polymerization of monomer, and polymer product is removed from the reactor by removing a portion of the suspension.

Suspension polymerization processes comprising two or more suspension polymerization reactors connected in series have been known for many years. One of the reasons why cascades of two or more polymerization reactors are frequently used is that it is possible to set different reaction conditions in the polymerization reactors and thereby, for example, broaden the molecular weight distribution. Polyolefin polymers with a broad molecular weight distribution are commonly used for a multitude of applications because they show advantages in product properties and processability. Such polymers are also often designated as bimodal or more generally as multimodal polyolefin polymers because they are polymerized in a cascade of two or more polymerization reactors under different reaction conditions. The term "multimodal", as used herein and also frequently used in the art, shall include "bimodal".

Multimodal polyolefin polymer can theoretically be obtained in different ways. It is possible to prepare physical blends of previously polymerized different polyolefin components. It is possible to use mixtures of different catalysts or so-called hybrid catalysts, which means catalysts with at least two different types of polymerization active sites on one catalyst particle in the same polymerization reactor. The commercially used way for preparing multimodal polyolefin is predominantly the polymerization in a cascade of polymerization reactors, where a polymerization catalyst is fed together with monomers to a first reactor, the produced polymer, which still contains active polymerization catalyst, is transferred to a second polymerization reactor, which has different reactor conditions, and the polymerization is continued using the polymerization catalyst still contained in the polymer particle. Normally the different reaction conditions in the different polymerization reactors are set by using different concentrations of hydrogen, which is commonly used as molecular weight regulator.

Such processes are used for producing multimodal ethylene copolymers with various olefins as comonomers, in particular 1-hexene or 1-butene, by suspension polymerization using different diluents. The multimodal ethylene copolymers are known to be especially suitable for producing pipes.

In U.S. Pat. No. 9,051,458, multimodal ethylene/1-butene copolymer was prepared using hexane as the diluent. In EP3176213, multimodal ethylene/1-hexene copolymer was prepared using hexane as the diluent. In U.S. Pat. No. 9,175,120, multimodal ethylene/1-hexene copolymer was prepared using isobutane as the diluent. In US2016369091, multimodal ethylene/1-hexene copolymer was prepared using propane as the diluent.

These known processes have a disadvantage that the separation of the diluent and the comonomer is difficult and/or that the product obtained from the polymer has lower mechanical properties such as strain hardening. It is further difficult to produce different types of copolymers in the same reactor system.

It is an objective of the present invention to provide a process in which the above-mentioned problems and/or other problems are solved.

BRIEF SUMMARY

In an aspect, a process for the preparation of a multimodal copolymer of ethylene and a comonomer which is 1-hexene and/or 1-butene in a series of polymerization reactors comprising at least a first polymerization reactor and a second polymerization reactor comprises: a) feeding ethylene, hydrogen and catalyst components (1) and a first diluent (29) to the first polymerization reactor (A) to prepare a first suspension (3) of solid particles of a first ethylene polymer in a first suspension medium, wherein the first diluent (29) comprises branched heptane and is essentially free of the comonomer; b) feeding the first suspension (3) to a flash drum (E) for vaporizing a part of the first suspension medium to obtain a hydrogen-depleted suspension (4), c) feeding the hydrogen-depleted suspension (4), ethylene and comonomer (9) and a second diluent (24 & 34) to the second polymerization reactor (H) to prepare a second suspension (11) of solid particles of a second ethylene polymer in a second suspension medium, wherein the second diluent (24 & 34) comprises branched heptane and the comonomer dissolved in the second diluent, d) processing the second suspension (11) to obtain a dry effluent (14) of the solid particles of the second ethylene polymer and a liquid stream (23) comprising branched heptane, the comonomer, and low molecular weight hydrocarbon reaction products, e) feeding at least part (25) of the liquid stream (23) to an evaporation system (Q) for separating non-volatile, low-molecular-weight hydrocarbon reaction products and subsequently to a distillation column (R) for separating the comonomer from branched heptane to obtain 1) a branched heptane liquid stream essentially free of the comonomer, 2) a vapor distillate (31) comprising the comonomer and branched heptane and 3) a liquid distillate (30) comprising branched heptane and the comonomer, f) feeding the liquid distillate stream (30) to the second polymerization reactor (B) to form at least part of the second diluent (34) and g) feeding the branched heptane liquid stream to the first polymerization reactor as the first diluent (29).

DETAILED DESCRIPTION

Accordingly, the invention provides a process for the preparation of a multimodal copolymer of ethylene and a comonomer which is 1-hexene and/or 1-butene in a series of polymerization reactors comprising at least a first polymerization reactor and a second polymerization reactor, the process comprising:

a) feeding ethylene, hydrogen and catalyst components and a first diluent to the first polymerization reactor to prepare a first suspension of solid particles of a first ethylene polymer in a first suspension medium, wherein the first diluent comprises branched heptane and is essentially free of the comonomer;

b) feeding the first suspension to a flash drum for vaporizing a part of the first suspension medium to obtain a hydrogen-depleted suspension, c) feeding the hydrogen-depleted suspension, ethylene and comonomer and a second diluent to the second polymerization reactor to prepare a second suspension of solid particles of a second ethylene polymer in a second suspension medium, wherein the second diluent comprises branched heptane and the comonomer dissolved in the second diluent, d) processing the second suspension to obtain a dry effluent of the solid particles of the second ethylene polymer and a liquid stream comprising branched heptane, the comonomer, and low molecular weight hydrocarbon reaction products, e) feeding at least part of the liquid stream to an evaporation system for separating non-volatile, low molecular weight hydrocarbon reaction products and subsequently to a distillation column for separating the comonomer from branched heptane to obtain 1) a branched heptane liquid stream essentially free of the comonomer, 2) a vapor distillate comprising the comonomer and branched heptane and 3) a liquid distillate comprising branched heptane and the comonomer, f) feeding the liquid distillate stream to the second polymerization reactor to form at least part of the second diluent and g) feeding the branched heptane liquid stream to the first polymerization reactor as the first diluent.

The present invention is based on the realization that the use of branched heptane as the diluent is optimal for an ethylene copolymerization system where both 1-hexene and 1-butene can be used as the comonomer. In both cases, branched heptane is easy to separate from the final product and the comonomer. Further, the final product has good mechanical properties since it contains low amounts of low molecular weight hydrocarbon reaction products such as waxes as the result of the use of branched heptane as the diluent.

In the first polymerization reactor, polymerization is performed in a first suspension medium which is essentially free of the comonomer. The first suspension medium comprises hydrogen added to the first reactor. Accordingly, particles of an ethylene homopolymer with a lower molecular weight are obtained in the first polymerization reactor.

Along with the desired ethylene homopolymer, low molecular weight hydrocarbon reaction products such as waxes are formed in the first polymerization reactor. Since the first suspension medium comprises branched heptane which has a relatively high dissolving power, the low molecular weight hydrocarbon reaction products are dissolved in branched heptane instead of being present in the solid phase together with the solid particles of the ethylene polymer.

The first suspension from the first reactor is then fed to a flash drum to obtain a hydrogen-depleted suspension, which is fed to the second polymerization reactor.

In the second polymerization reactor, polymerization is performed in a second suspension medium. The second suspension medium comprises a second diluent in which comonomer is dissolved. The second suspension medium further comprises comonomer added to the second reactor. Normally, no additional hydrogen is fed to the second reactor and thus the hydrogen level in the second suspension medium is low. Accordingly, an ethylene copolymer with a higher molecular weight is prepared in the second polymerization reactor. The second ethylene polymer is a multimodal copolymer, i.e. a mixture of the first ethylene polymer made in the first reactor (low molecular weight ethylene homopolymer) and the ethylene copolymer made in the second reactor (high molecular weight ethylene copolymer).

Similar to the first suspension medium, low molecular weight hydrocarbon reaction products are dissolved in branched heptane in the second suspension medium.

Subsequently, the second suspension from the second reactor is processed to remove the liquid phase to obtain dry solid particles of the second ethylene polymer. The dry solid particles have a low content of low molecular weight hydrocarbon reaction products because most of the liquid phase is removed by centrifugation and low molecular weight hydrocarbons are removed along with the liquid phase. This advantageously improves mechanical properties of the articles made from the ethylene copolymer made according to the present invention.

A liquid stream of branched heptane and components dissolved therein (e.g. the comonomer and the low molecular weight hydrocarbon reaction products) is also obtained from the second suspension. This liquid stream is processed to be recycled as the second diluent comprising the comonomer and the first diluent essentially free of the comonomer.

At least part of the liquid stream is treated in an evaporation system to obtain a stream from which separate non-volatile, low molecular weight hydrocarbon reaction products are separated and said stream is subsequently separated by distillation into 1) a branched heptane liquid stream essentially free of the comonomer, 2) a vapor distillate comprising the comonomer and branched heptane and 3) a liquid distillate comprising branched heptane and the comonomer.

Due to the use of branched heptane as the diluent, it is easy to obtain a branched heptane liquid stream essentially free of the comonomer by distillation. The branched heptane stream is fed to the first polymerization reactor as the first diluent. The streams comprising both branched heptane and the comonomer are fed to the second polymerization reactor as at least part of the second diluent.

The use of branched heptane as the diluent is advantageous because it is heavy enough to dissolve low molecular weight hydrocarbon reaction products while being light enough to be easily removed from the product e.g. by a fluidized bed dryer. When used as the diluent, lighter alkanes have a less dissolving power of waxes, resulting in a higher amount of waxes in the final product. Heavier alkanes as well as n-heptane and cycloheptane if used as the diluent are more difficult to remove from the product, causing health and safety hazards. A further advantage of the use of branched heptane as the diluent is that due to the relatively high boiling point of branched heptane, reactor pressure can be moderate (e.g. less than 1.5 MPa), keeping reactor costs low.

Polyolefin

The polyolefin polymer obtained by the process of the present invention is a multimodal copolymer of ethylene and 1-hexene, a multimodal copolymer of ethylene and 1-butene or a multimodal copolymer (terpolymer) of ethylene, 1-hexene and 1-butene.

In the context of the present invention the term "multimodal" shall indicate that the polyolefin comprises at least two fractions of polymers which are obtained under different polymerization conditions. That means the term "multimodal" as used herein shall include also "bimodal". The different polymerization conditions can for example be achieved by using different hydrogen concentrations in different polymerization reactors. The term "copolymer" includes both bipolymers (made of two monomers) and terpolymers (made of three monomers).

Preferably, the amount of ethylene derived units is 60 to 99 wt % and the amount of the comonomer derived units in the multimodal copolymer of the invention is 1 to 40 wt %.

When a multimodal copolymer of ethylene, 1-hexene and 1-butene is made, the weight ratio between the 1-hexene derived units and the 1-butene derived units may be 1:99 to 99:1, for example 10:90 to 90:10, for example 50:50.

The copolymer of ethylene and 1-hexene according to the invention has excellent mechanical properties, in particular a high strain hardening value of e.g. at least 75 MPa as determined according to ISO 18488:2015. The process also allows production of polymer grades where strain hardening is not critical by the use of 1-butene as the comonomer, which is less expensive than 1-hexene.

Catalyst

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)2Cl2$, $Ti(OC_2H_5)2Cl2$, $Ti(O-n-C_4H_9)2Cl2$, $Ti(OC_2H_5)2Br2$, $Ti(OCH_3)3Cl$, $Ti(OC_2H_5)3Cl$, $Ti(O-n-C_4H_9)3Cl$, $Ti(OC_2H_5)3Br$, $Ti(OCH_3)4$, $Ti(OC_2H_5)4$ or $Ti(O-n-C_4H_9)4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides. SiCl4 or CCl4 and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di(C1-C10-alkyl) magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

In preferred embodiments, the catalyst components comprise diethoxymagnesium, $Ti(O-n-C_4H_9)_4$ and ethylaluminum dichloride and a co-catalyst which is tri-isobutylaluminum or triethylaluminum.

Reactor

The process of the present invention is carried out in a series of polymerization reactors comprising at least two polymerization reactors which are connected in series. These reactors are not restricted to any specific design. Preferably, these reactors are loop reactors or stirred tank reactors.

It is possible that the process of the present invention is only carried out in a series of two reactors (the first and the second polymerization reactor). It is however also possible that there are further reactors connected to upstream or downstream of these reactors. Preferably the further reactors are added downstream of the first and the second reactors.

There is no limit to the number of further reactors, but preferably there are not more than two, more preferably only one further reactor added. Thus, in particularly preferred embodiments, the process of the present invention is carried out in a series of three polymerization reactors which are connected in series, which are the first reactor, the second reactor and a further reactor downstream of the second reactor. The further polymerization reactor may be equipped with a hydrogen degassing system.

If there are further polymerization reactors added to the series of the first and the second polymerization reactors, these further polymerization reactors can also be suspension polymerization reactors or can utilize other low-pressure polymerization methods like gas-phase polymerization.

Preferably, the further polymerization reactors are suspension polymerization reactors, in particular of the same type as the suspension reactors used in first and the second reactors.

The further polymerization reactors may also be gas-phase reactors like horizontally or vertically stirred gas-phase reactors, fluidized bed gas-phase reactors or multizone circular reactors, in which two polymerization zones are linked to one another and the polymer is passed alternately a plurality of time through these two zones.

Suspension

The polymerization in the at least two polymerization reactors of the present invention is carried out in suspension in a suspension medium. Hereby a suspension polymerization denotes a polymerization in which the polymerization is carried out in a medium, which is in liquid or in supercritical state under the conditions in the polymerization reactor, and in which the produced polyolefin is insoluble and forms solid particles. The solids content of the suspension is generally in the range of from 10 to 80 wt. %, preferably in the range of from 20 to 40 wt. %.

Hydrogen

Hydrogen is used in the process of the present invention to control the molecular weight of the polyolefin produced in the respective polymerization reactors, wherein the hydrogen concentration in the first polymerization reactor is higher than in the second polymerization reactor. Accordingly, the molecular weight of the polyolefin prepared in the second polymerization reactor is generally higher than in the first polymerization reactor.

Step a)

In step a), ethylene, hydrogen, catalyst components and a first diluent are fed to the first polymerization reactor. Ethylene is polymerized. A first suspension of solid particles of a first ethylene polymer in a first suspension medium is formed.

Preferably, the polymerization in the first polymerization reactor is carried out at a pressure of 0.1 to 20 MPa, for example 0.1 to 5 MPa or 0.3 to 1.5 MPa. Particularly preferably, the polymerization in the first polymerization reactor is carried out at a pressure of less than 1.5 MPa.

Preferably, the polymerization in the first polymerization reactor is carried out at a temperature of 40 to 130° C., more preferably 50 to 110° C., and particularly preferably from 60 to 90° C. The temperature in the first polymerization reactor is below the melting point of the polymer in the first reactor.

The first suspension medium which forms the liquid or supercritical phase of the first suspension consists of the first diluent and various components dissolved in the first suspension medium.

The first suspension medium comprises ethylene and residues of catalyst components, dissolved in the first suspension medium. The first suspension medium further comprises hydrogen dissolved in the first suspension medium. During the polymerization, low molecular weight hydrocarbon reaction products are also formed, which may include polyethylene waxes, oligomers, alkanes produced by polymerization (C4, C6, C8, C10, C12, C14 . . . ); alkene isomers (e.g. 2-hexene). These low molecular weight hydrocarbon reaction products are also dissolved in the first suspension medium.

The first diluent comprises branched heptane (one or more of 2-Methylhexane, 3-Methylhexane, 2,2-Dimethylpentane, 2,3-Dimethylpentane, 2,4-Dimethylpentane, 3,3-Dimethylpentane, 3-Ethylpentane, 2,2,3-Trimethylbutane in any ratio) as the main component. For example, the amount of branched heptane in the first diluent is at least 90 wt %, preferably at least 95 wt %, of the first diluent. The first diluent essentially consists of C6 and C7 alkanes, i.e. the amount of C6 and C7 alkanes in the first diluent is at least 99.0 wt % of the first diluent.

Examples of the C6 and C7 alkanes which may be present in the first diluent in addition to the branched heptane include 2,3-dimethylbutane, 2-methylpentane, 3-methylpentane, n-hexane, methylcyclopentane, cyclohexane, 1,1-dimethylcyclopentane, 1,3-dimethylcyclopentane, dimethylcyclopentane, tr-1,2-dimethylcyclopentane, cis-1,2-dimethylcyclopentane and n-heptane.

The first diluent is essentially free of the comonomer. Preferably, the amount of the comonomer in the first diluent is at most 0.1 wt % of the first diluent, more preferably the amount of comonomer in the first diluent is at most 0.01 wt % (or 100 ppm) of the first diluent.

The first suspension medium is essentially free of the comonomer. Preferably, the amount of the comonomer in the first suspension medium is at most 0.1 wt % of the first suspension medium, more preferably the amount of comonomer in the first suspension medium is at most 0.01 wt % (or 100 ppm) of the first suspension medium.

Step b)

The first suspension from the first polymerization reactor is withdrawn and fed to a flash drum. Because of the pressure difference between the first polymerization reactor and the flash drum it is normally not necessary to use a pump for transferring the suspension.

The suspension can be withdrawn directly from the first polymerization reactor. In case of a loop reactor it is also possible to withdraw the suspension from a settling leg.

Furthermore, if the first polymerization reactor is equipped with a cooling circuit, it is preferred to withdraw the suspension from the cooling circuit, preferably after the circulation pump facilitating the transfer to the flash drum. In such a case the withdrawal point may be located after the heat exchanger. Then a suspension of a lower temperature than that in the first polymerization reactor is fed to the flash drum, limiting the amounts of evaporating components of the suspension medium.

More preferably the withdrawal point is located before the heat exchanger. Then the suspension is fed to the flash drum with essentially the same temperature as that of the suspension in the first polymerization reactor and the amount of vaporized material including driven out hydrogen is increased.

A flash drum is generally a vessel which is operated at a lower pressure than that of the first polymerization reactor. Consequently, the suspension medium starts to boil in the flash drum and a part of it is vaporized. In addition to evaporating the diluent also gases dissolved in the suspension medium are driven to the gas-phase. Accordingly, the concentration of hydrogen in the suspension in the flash drum is significantly lower than the concentration of hydrogen in the first suspension in the first polymerization reactor.

The flash drum is generally of a volume that it can be operated partly filled with suspension and the remaining part is occupied by the gas mixture escaping from the suspension. The flash drum can be operated with or without a stirrer. It is further possible to have the flash drum equipped with a jacket for cooling or heating the flash drum in order to influence the temperature within the flash drum. It is further possible to use a series of more than one vessel as combined flash drum for the purpose of the present invention.

Preferably, the pressure in the flash drum is controlled by a vacuum pump connected to the flash drum. The vacuum pump is configured to monitor and adjust the pressure in the flash drum. The vacuum pump may be a root blower.

In some preferred embodiments, the pressure in the flash drum is lower than 0.1 MPa, for example 0.05 to 0.09 MPa. Such low pressure made possible by a vacuum pump allows $H_2$ concentration of below 1 ppm to be attained in the second reactor inlet.

The temperature in the flash drum is normally not controlled, and it is the result of an adiabatic or semi-adiabatic flash at the specified pressure of the vessel. For the typical pressures and diluents under consideration, the temperature of the flash vessel ranges from 40 to 80° C., more typically 60 to 80° C. In general, higher temperatures improve degassing. Higher temperatures can be attained by providing heat, e.g., via the vessel jacket, in a non-adiabatic flash. Temperatures lower than 40° C. are undesired and they may lead to wax deposition and fouling in the transfer line to the second reactor.

In some embodiments, a stripping agent (e.g. nitrogen) is introduced into the flash vessel. This further improves $H_2$ removal. However, the stripping agent must later be recovered in a separate process. Thus, in some embodiments, no stripping agent is introduced into the flash vessel.

A low pressure of the flash drum, such as lower than 0.1 MPa, allows a better removal of hydrogen. A better removal of hydrogen leads to a larger difference in the molecular weights of the polymers produced in the first and the second polymerization reactors.

Preferably, a single flash drum is used instead of a series of flash drums. This is advantageous for cost efficiency.

A heat exchanger may be present between the flash drum and the vacuum pump. In this case, the gas in the flash drum is withdrawn from the flash drum and fed to the heat exchanger, where a part of the gas is condensed. The remaining part, which is not condensed, is preferably fed to the work-up section of the polymerization plant for recovering the components of the suspension medium and in particular directly to the monomer recovery unit.

Any kind of heat exchanger can be used between the flash drum and the vacuum pump. The heat exchanger may be a shell-and-tube heat exchanger. The temperature of the cooling medium, which, for example, can be cooling water or the cooling medium of a chiller, is preferably selected to be in the range of from −20 to 40° C.

In some embodiments, the heat exchanger is a vertical reflux condenser. In this case, the condensed liquid obtained in the heat exchanger flows down by gravity back to the flash vessel. In other embodiments, the heat exchanger is a condenser where the liquid is discharged to a separate tank using a barometric leg or a drain pump.

The liquid obtained in the heat exchanger may be fed to a point in the process where suspension is present, such as the flash vessel, the first polymerization reactor or the second polymerization reactor. Alternatively, the liquid obtained in the heat exchanger may be fed to a point in the process downstream of the second polymerization reactor where no slurry suspension is present Returning the liquid obtained in the heat exchanger to a point in the process where suspension is present can reduce the amount of diluent added to the first or second polymerization reactor from other sources. Returning the liquid obtained in the heat exchanger to a point in the process downstream of the second polymerization reactor where no suspension is present reduces the solvent load in liquid/solid separation units such as the centrifuge and the dryer.

Step c)

The polymer suspension in the flash drum, which is depleted in hydrogen with respect to the suspension fed to the flash drum, is withdrawn from the flash drum and fed to the second polymerization reactor. This is preferably carried out by means of a transfer pump. Ethylene and comonomer are also fed to the second polymerization reactor. Further, a second diluent is fed to the second polymerization reactor. The monomers are polymerized. A second suspension of solid particles of a second ethylene polymer in a second suspension medium is formed.

Preferably, the polymerization in the second polymerization reactor is carried out at a pressure of 0.1 to 20 MPa, preferably 0.1 to 1 MPa and particularly preferably 0.1 to 0.5 MPa.

Preferably, the polymerization in the second polymerization reactor is carried out at a temperature of 40° C. to 130° C., more preferably 50 to 110° C., and particularly preferably from 60 to 90° C. The temperature in the second polymerization reactor is below the melting point of the polymer in the second reactor.

The second suspension medium which forms the liquid or supercritical phase of the second suspension is formed by the medium of the hydrogen-depleted suspension from the flash drum and the second diluent, as well as various components dissolved in the second suspension medium.

The second suspension medium comprises ethylene, comonomer and residues of catalyst components, dissolved in the second suspension medium. The second suspension medium may comprise hydrogen, but its level is low. Similar to the polymerization in the first reactor, low molecular weight hydrocarbon reaction products are also formed during the polymerization, which may include polyethylene waxes, oligomers, alkanes produced by polymerization (C4, C6, C8, C10, C12, C14 . . . ); alkene isomers (e.g. 2-hexene). These low molecular weight hydrocarbon reaction products are also dissolved in the second suspension medium.

The second diluent comprises branched heptane as the main component. For example, the amount of branched heptane in the second diluent is at least 90 wt %, preferably at least 95 wt %, of the second diluent. The second diluent essentially consists of C6 and C7 alkanes and the comonomer. Preferably, the total amount of C6 and C7 alkanes and the comonomer in the second diluent is at least 99.0 wt % of the second diluent.

Examples of the C6 and C7 alkanes which may be present in addition to the branched heptane in the second diluent include various C6 and C7 alkanes, such as 2,3-dimethylbutane, 2-methylpentane, 3-methylpentane, n-hexane, methylcyclopentane, cyclohexane, 1,1-dimethylcyclopentane, 1,3-dimethylcyclopentane, dimethylcyclopentane, tr-1,2-dimethylcyclopentane, cis-1,2-dimethylcyclopentane and n-heptane.

The second diluent further comprises the comonomer dissolved in the second diluent. Preferably, the amount of the comonomer in the second diluent is 1 to 10 wt % of the second diluent. More preferably, the amount of comonomer in the second diluent is 2 to 6 wt % of the second diluent.

Preferably, the amount of the comonomer in the second suspension medium is 1 to 10 wt %, more preferably 2 to 6 wt %, of the second suspension medium.

Step d)

The second suspension from the second reactor is processed to remove the liquid phase to obtain a dry effluent of the solid particles of the second ethylene polymer. A liquid stream comprising branched heptane, the comonomer and low molecular weight hydrocarbon reaction products is also obtained.

The second ethylene polymer has low amount of branched heptane, i.e. preferably the amount of branched heptane in the second ethylene polymer is at most 0.2 wt % as determined by gas chromatography, using for instance the "hot jar" method described in ASTM D4526-96. More preferably, the residual amount of branched heptane and other volatile hydrocarbons is at most 0.1 wt % (1000 ppm) or at most 0.05 wt % (500 ppm) of the second ethylene polymer.

In some preferred embodiments, step d) involves d1) feeding the second suspension to a decanter centrifuge to obtain the liquid stream and a concentrated slurry rich in the solid particles of the second ethylene polymer and d2) feeding the concentrated slurry to a dryer such as a fluidized bed dryer to obtain the dry effluent of the solid particles of the second ethylene polymer Since the low molecular weight hydrocarbon reaction products are in the second suspension medium due to the use of the branched heptane, the concentrated slurry obtained by step d1) does not contain a high level of low molecular weight hydrocarbon reaction products. The obtained concentrated slurry is subsequently fed to a (fluidized bed) dryer to further remove the liquid components, resulting in a dry effluent of the solid particles of the second ethylene polymer.

The branched heptane can be separated from the solid particles relatively easily in a fluidized bed dryer. Fluidized bed dryers rely on an inert gas to carry out evaporated hydrocarbons. Once the drying gas has passed through the dryer, hydrocarbon vapors must be at least partially removed from the drying gas, before the drying gas can be re-circulated back into the dryer. Hydrocarbons vapors are normally removed from the drying gas by condensation. Because branched heptane is more easily condensed than n-hexane and other lighter diluents, the purity of the returning drying gas is higher with branched heptane than with n-hexane at the same condensing conditions. The advantage of high purity in the returning drying gas offsets the disadvantage of lower volatility of branched heptane (with respect to n-hexane) in the overall drying process.

The dry effluent from the fluidized bed dryer may still contain impurities and catalyst residues. The dry effluent may thus be sent to a silo for further degassing and for the neutralization of catalyst residues e.g. by wet nitrogen stripping. Accordingly, the dry effluent of the solid particles of the second ethylene polymer may be subjected to degassing such that the amount of branched heptane in the resulting solid particles of the second ethylene polymer is at most 1000 ppm, preferably at most 500 ppm. The outlet of the silo may be sent to an extruder for pelletization.

Accordingly, step d) preferably further comprises after step d2) the step of d3) feeding the dry effluent of the solid particles exiting the (fluidized bed) dryer to a silo where final degassing with an inert drying gas, and the neutralization of catalyst residues with a polar component takes place.

Step e)

The liquid stream obtained in step d) is processed for providing the first diluent and the second diluent.

The composition of the liquid stream is essentially the same as that of the second suspension medium.

Preferably, a part of the liquid stream is fed to the second polymerization reactor without any purification to form part of the second diluent.

At least part of the liquid stream is fed to an evaporation system to separate non-volatile, low-molecular-weight hydrocarbon reaction products from the rest. The stream from which non-volatile, low molecular weight hydrocarbon reaction products are separated is subsequently sent to a distillation column. From the distillation column, 1) a branched-heptane liquid stream essentially free of comonomer, 2) a vapor distillate containing the comonomer and branched-heptane and 3) a liquid distillate containing the comonomer and branched-heptane are obtained.

Due to the volatility difference between comonomer and the diluent, a distillation column of moderate height/size is capable of obtaining a branched-heptane liquid stream essentially free of comonomer. This is in contrast to a large height distillation column required for separating 1-hexene comonomer from n-hexane diluent to obtain a n-hexane stream essentially free of 1-hexene comonomer.

In the state of the art, the distillation column produces two streams of relatively high purity: a diluent stream essentially free of comonomer, and a vapor distillate rich in comonomer. The purified diluent is sent to the first reactor, where the presence of comonomer is undesired. The vapor distillate is mixed with diluent downstream in the process, and the comonomer concentration is diluted.

In this invention, it is recognized that the separation in the distillation tower requires a branched-heptane stream essentially free of comonomer, but not a comonomer stream essentially free of branched heptane. This leads to a reduction in the size of the distillation tower, because no additional separation stages are dedicated to the purification of co-monomer. Most of the comonomer is recovered in the liquid distillate as a mixture of co-monomer and branched heptane.

The bottom outlet of the distillation column is the outlet for the branched-heptane liquid stream essentially free of comonomer. The two top outlets are for the distillates comprising both the comonomer and branched heptane. The upper outlet is for the vapor distillate which comprises non-condensable gases such as hydrogen, methane, ethane and ethylene gas, as well as comonomer gas and branched heptane gas. The lower outlet is for the liquid distillate which comprises the comonomer and branched heptane in a liquid phase.

Step f)

The liquid distillate obtained in step e) is recycled back to the second reactor, where it forms at least part of the second diluent.

Preferably, the vapor distillate obtained in step e) is cooled to lower temperatures than those used in the distillation column to recover condensable products such as the comonomer, and the obtained condensate from the vapor distillate is fed to the second reactor as part of the second diluent.

Thus, the second diluent comprises the liquid distillate obtained in step e). The second diluent may further comprise the condensate from the vapor distillate. A part of the liquid stream produced in step d1) may also be fed to the second polymerization reactor without any purification to form part of the second diluent.

Step g)

The branched-heptane liquid stream obtained in step e) is recycled back to the first reactor as the first diluent.

Multimodal Copolymer

The present invention further relates to the multimodal copolymer prepared according to the process according to the invention.

Preferably, the multimodal copolymer has a density of 930 to 970 kg/m3, more preferably the copolymer density is between 945 and 960 kg/m3.

Preferably, the multimodal copolymer has a melt flow index as determined by ISO1133-1:2011 (190° C., 5 kg) ranging between 0.1 to 10 dg/min.

In some preferred embodiments, the comonomer is 1-hexene, and the copolymer has a strain hardening value of at least 75 MPa measured according to ISO 18488:2015. This copolymer is well suited for the production of conventional and resistant to crack (RC) pipes.

In some preferred embodiments, the comonomer is 1-butene, and the copolymer has a strain hardening value below 75 MPa according to ISO 18488:2015. The 1-butene copolymers have lower manufacturing costs than 1-hexene counterparts, mostly because of differences in raw material costs. The 1-butene copolymers are well suited for applications other than RC pipes, such as conventional pipe, film, blow molding, and injection molding.

In some embodiments, the copolymer is a terpolymer of 1-butene, 1-hexene, and ethylene. The physical properties and manufacturing costs of these copolymers are in between those of 1-butene and 1-hexene copolymer counterparts. Terpolymers can cover the entire range of applications for multimodal HDPE, and they facilitate the transition between 1-butene and 1-hexene copolymers in HDPE manufacturing plants.

The present invention further relates to an article comprising the multimodal copolymer according to the invention, for example a pipe such as a resistant to crack pipe or a conventional pipe, a film and articles made by blow molding or injection molding.

The present invention further relates to use of the multimodal copolymer according to the invention for making a pipe such as a resistant to crack pipe or a conventional pipe, a film and articles made by blow molding or injection molding.

System

The present invention further provides a system for performing the process according to the invention. The system comprises the series of polymerization reactors, the flash drum, the solvent evaporation system and the distillation column, each adapted for performing the process according to the invention. The system may further comprise other components.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

Figure 1:
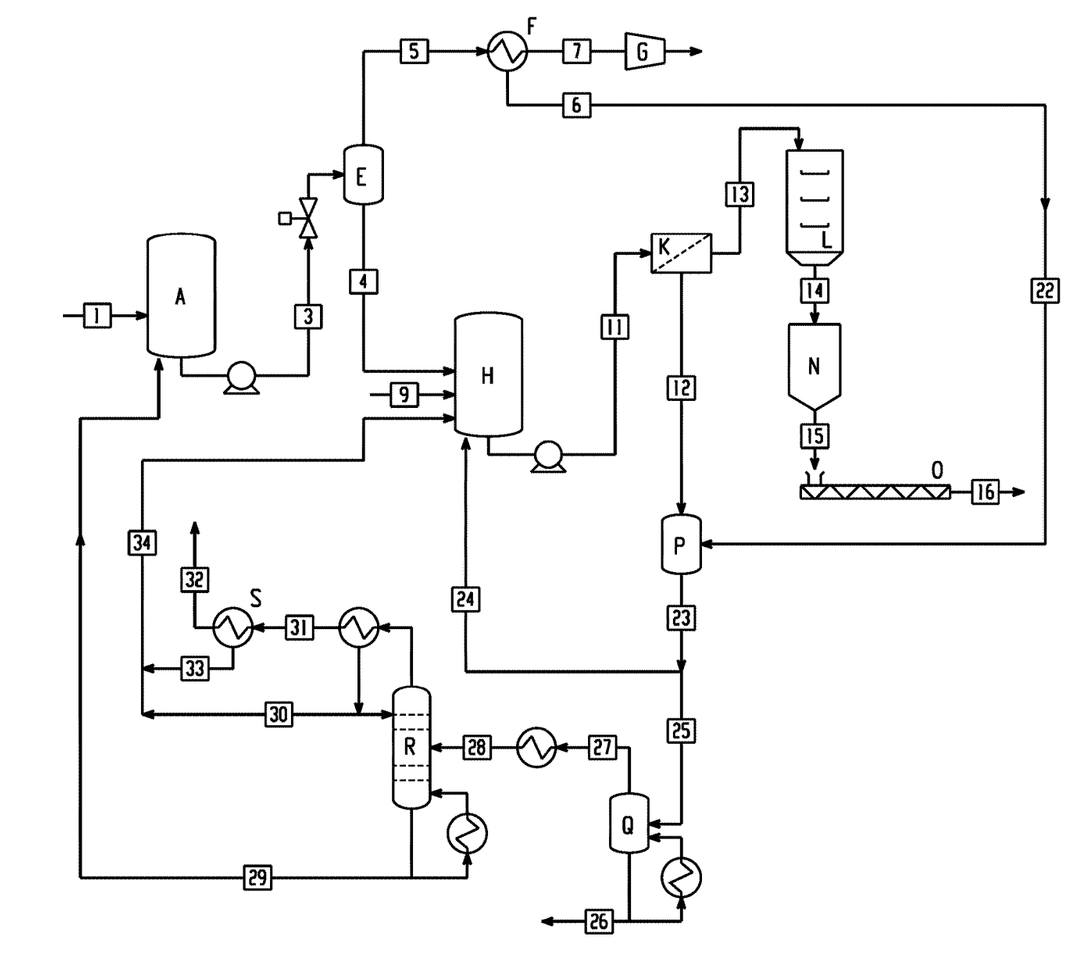
The FIGURE is an illustration of an embodiment of the present system.

The invention is now elucidated with reference to FIG. 1 which schematically illustrates an embodiment of the system of the invention.

The FIGURE shows an example of a schematic of the process according to the invention.

Reactants (1) ethylene, hydrogen, and catalyst components are fed to a first polymerization reactor (A), along with a first diluent (29). Ethylene polymerization takes place and a first suspension (3) of solid particles of a first ethylene polymer in a first suspension medium is prepared.

The first suspension (3) is withdrawn from the first polymerization reactor (A) and fed to a flash drum (E). A part (5) of the first suspension medium is vaporized to obtain a hydrogen-depleted suspension (4). The pressure in the flash drum (E) is controlled by a vacuum pump (G) connected to the flash drum (E). A heat exchanger (F) is present between the flash drum (E) and the vacuum pump (G). The gas in the flash drum (E) is withdrawn from the flash drum (E) and fed to the heat exchanger (F), where a part (6) of the gas is condensed. The remaining part (7), which is not condensed, is fed to the work-up section (not shown) of the polymerization plant for recovering the components of the suspension medium and in particular directly to the monomer recovery unit.

The hydrogen-depleted suspension (4) in the flash drum (E) is withdrawn from the flash drum (E) and fed to the second polymerization reactor (H). Reactants ethylene and comonomer (9) are also fed to the second polymerization reactor (H). Further, a second diluent (24 & 34) is fed to the second polymerization reactor (H). Ethylene copolymerization takes place and a second suspension (11) of solid particles of a second ethylene polymer in a second suspension medium is prepared. In the second suspension (11), low molecular weight hydrocarbon reaction products are present, dissolved in the diluent.

The second suspension (11) is withdrawn from the second polymerization reactor (H) and fed to a decanter centrifuge (K). The second suspension (11) is separated into a concentrated slurry (13) rich in the solid particles of the second ethylene polymer, and a liquid stream (12) rich in branched heptane and the comonomer.

The concentrated slurry (13) is fed to a fluidized bed dryer (L) to obtain a dry effluent (14) of the solid particles of the second ethylene polymer. The dry effluent (14) is sent to a silo (N) for further degassing and for the neutralization of catalyst residues. The outlet (15) of the silo (N) is sent to an extruder (O) for pelletization to obtain pellets (16).

The liquid stream (12) is combined with other diluent sources (22) into the collecting tank (P). The outlet of the collecting tank (P) is a liquid stream (23), which is divided and partly fed to the second polymerization reactor (H) to form part of the second diluent (24). Part (25) of the liquid stream is fed to a solvent evaporation system (Q) in order to separate non-volatile, relatively-low-molecular-weight hydrocarbon reaction products (26), such as polyethylene wax. The resulting effluent (27) from the solvent evaporation system (Q) is fed to a distillation column (R). The distillation column (R) separates the incoming stream (28) into 1) a first diluent (29), which is a branched-heptane liquid stream essentially free of comonomer, 2) a relatively small vapor distillate (31) comprising non condensable gases, along with comonomer and diluent vapors, and 3) a liquid distillate (30) containing diluent and comonomer.

The condenser (S) separates the condensable fraction of the vapor distillate as a vapour distillate condensate (33) from the non-condensable fraction (32) of the vapor distillate. The vapour distillate condensate (33) is mixed with the liquid distillate (30), and the diluent mixture is fed to the second polymerization reactor (H) to form part of the second diluent (34).

The branched heptane stream (29) is fed to the first polymerization reactor (A) as the first diluent (29). Purification beds (not shown in the FIGURE are used to remove polar components in diluent streams (29, 30 and 33) before they enter any of the reactors.

Comparative Examples from a Process Point of View

Aspen Tech® software was used to simulate HDPE production with known diluent alternatives. Aspen Tech software has well-established models to evaluate chemical processes, and it is a standard tool for process design and engineering. Three main criteria were used to evaluate the suitable of the HDPE production processes: 1) the reactor pressure, 2) the complexity of the comonomer separation from the diluent, and 3) the complexity of the diluent removal from the final product.

The required reactor pressure was determined by calculating the vapor pressure of the $1^{st}$ reactor mixture, where hydrogen is present and pressures are higher than in downstream reactors. High pressure requires special design consideration such as thicker steel or special metallurgy. In general, the cost of processing equipment increases with increasing pressure. Pressures of 30 bar and higher are given a rating of "high" in the comparative table shown below. Pressures lower than 15 bar are given a rating of "low."

The complexity of the comonomer separation was evaluated by determining the minimum number of theoretical stages required to produce a diluent stream with only 100 ppm of co-monomer. Both comonomers 1-butene and 1-hexene were considered, as it is required for the same distillation column to be able to separate both co-monomers for optimal HDPE grade flexibility. The minimum number of stages was calculated with the Aspen DSTWU shortcut method, which is based on the Winn equation (The Petroleum Refiner, 37(5), p. 216, 1958). A number of theoretical stages higher than 40 was given a rating of "High". Less than 20 stages was deemed indicative of a "Low" complexity of separation.

The complexity of diluent removal was evaluated by determining the residual volatile hydrocarbons (in wt. ppm) after 5 hours of nitrogen stripping at 90° C. of a polymer sample initially containing 1% residual solvent. A level of 1% residual diluent is a typical result of drying in a fluidized bed dryer before a final step via nitrogen stripping is conducted in a silo. The level of residual volatiles after nitrogen stripping is indicative of the level of residual volatiles in the final product. A level higher than 1000 ppm was considered "High". A level below 500 ppm was deemed "Low".

The quantitative information is summarized in the comparative table below, where "High" was assigned a numerical value of zero, "Medium" was assigned a numerical value of five, and "Low" was assigned a numerical value of ten, for ranking purposes. The overall process score was calculated by adding the contribution of each factor (reactor pressure, co monomer separation, solvent removal), giving equal weight to each of factor. The higher the overall score the better the process, according to the selected criteria. The highest score was obtained for the process described in this invention. This result illustrates the comparative advantage of the invention from a process point of view.

TABLE 1

| Example | Reactor pressure | Complexity of Comonomer separation | Complexity of solvent removal from product | Overall process score |
| --- | --- | --- | --- | --- |
| iso-butane | High (30 bar) | High. 1-butene requires stages 65 stages, 1-hexene requires 4 stages | Low (<500 ppm) | 10 |
| Hexane | Low (11 bar) | High. 1-butene requires 6, but 1-hexene requires 70 stages | Medium (500 to 1000 ppm) | 15 |

TABLE 1-continued

| Example | Reactor pressure | Complexity of Comonomer separation | Complexity of solvent removal from product | Overall process score |
|---|---|---|---|---|
| branched-heptane (2-methylhexane) | Low (10 bar) | Low. 1-butene requires 5 stages, 1-hexene needs 14 stages | Medium (500 to 1000 ppm) | 25 |
| n-octane | Low (9 bar) | Low. 1-butene requires 4 stages, 1-hexene requires 7 stages | High (>1000 ppm) | 20 |

Comparative Examples from a Product Point of View

Samples of commercially available resistant-to-crack (RC) pipe resins were tested to determine their strain hardening. Strain hardening (SH) was determined according to ISO 18488:2015. The analyzed samples were produced using different process technologies. Table 2 summarizes some of the process features (co-monomer, diluent, reactor type) employed for the manufacturing of each commercial sample, along with the resulting strain hardening values and the melt flow rate (MFR) of each product. It is important to compare samples with similar melt flow ratios, when comparing the strain hardening of different samples.

All other things being equal, the strain hardening of a sample can be partially increased by decreasing its melt flow rate. The decrease in melt flow rate, however, also results in poor melt flow during the manufacturing of pipe and other final polymer articles. The MFR of commercially available RC resins ranges from 0.2 to 0.3 dg/min, and it is already approaching the low end of what is desired for current pipe manufacturing operations.

TABLE 2

| Comonomer | Diluent | Reactor system | Product Name (MFR 190° C./5 kg)* | Strain Hardening, MPa |
|---|---|---|---|---|
| 1-butene | hexane | CSTRs (continuous stirred-tank reactors) | CRP100 Resist (0.23 dg/min) | 58 |
| 1-hexene | propane | Loop and Gas Phase | 3490 LSH Black (0.25 dg/min) | 66 |
| 1-hexene | iso-butane | Loops | TUB 125N 6000 orange (0.30 dg/min) | 80 |
| 1-hexene | branched-heptane | CSTRs (continuous stirred-tank reactors) | This invention (0.23 dg/min) | 89 |

*MFR is the Melt Flow Rate of the product measured according to ISO 1133 at the specified conditions: 190° C. and 5 kg load.

To compare the SH values of commercial samples with those attainable with this invention, the steps a), b), c) and d) of this invention were implemented in a continuous mini plant, producing approximately 1 kg/h of powder product. Steps e), f), and g) deal with diluent/comonomer purification and recovery and their absence from the mini-plant process does not affect the quality of the product made in the mini plant Similarly, small deviations in step d) between the FIGURE and the actual mini-plant process do not affect the quality of the mini plant product. Step d1) in the mini plant was performed as in the FIGURE, using a continuous decanter centrifuge to remove the bulk of the diluent and the bulk of the polyethylene waxes without evaporation. Steps d2) and d3) were performed in batch mode, in a vacuum oven under a nitrogen atmosphere, due to the lack of commercially available, continuous fluidized-bed dryers at the mini plant scale.

Table 3 summarizes the operating conditions for the production of a typical RC sample in the mini-plant.

TABLE 3

| 1st Reactor | Temperature, ° C. | 88 |
|---|---|---|
| | Pressure, bar | 12 |
| | H2/C2 | 5 |
| | C6/C2 | 0 |
| 2nd Reactor | Temperature, ° C. | 78 |
| | Pressure, bar | 4 |
| | H2/C2 | 0.026 |
| | C6/C2 | 0.035 |
| Final Product | MFR (190° C. 5 kg) | 0.23 |
| | Powder density, kg/m$^3$ | 949 |
| | Strain Hardening, MPa | 89 |

The H2/C2 quantity denotes the molar ratio of hydrogen to ethylene in the gas phase of the slurry reactor. Similarly, C6/C2 denotes the molar ratio of 1-hexene to ethylene in the gas phase of the slurry reactor. These gas-phase molar ratios (H2/C2 and C6/C2) are standard ways to define the gas composition in a slurry reactor, and they are commonly used as set points for reactor control.

The catalyst employed in the mini-plant copolymerizations is a titanium-based Ziegler-Natta catalyst made by reacting magnesium ethoxide, titanium butylate, and ethyl-aluminum dichloride. The co-catalyst used in the mini-plant copolymerization is tri-iso-butylaluminum.

Table 2 shows that this invention achieves higher strain hardening values than all the commercial sample tested, even when compared with other 1-hexene copolymers of similar MFR values.

This surprising result cannot be fully explained by the small differences in the MFR values of the 1-hexene copolymers. The high SH values of the samples made with this invention are believed to be at least partly caused by the removal of non-volatile, low-molecular-weight hydrocarbon reaction products, such as polyethylene wax, which are not removed in processes that use light diluents and that remove light diluents from the product mainly by evaporation.

The invention claimed is:

1. A process for the preparation of a multimodal copolymer of ethylene and a comonomer which is 1-hexene and/or 1-butene in a series of polymerization reactors comprising at least a first polymerization reactor and a second polymerization reactor, the process comprising:
a) feeding ethylene, hydrogen and catalyst components (1) and a first diluent (29) to a first polymerization reactor (A) to prepare a first suspension (3) of solid particles of a first ethylene polymer in a first suspension medium, wherein the first diluent (29) comprises branched heptane and is essentially free of the comonomer;
b) feeding the first suspension (3) to a flash drum (E) for vaporizing a part of the first suspension medium to obtain a hydrogen-depleted suspension (4),
c) feeding the hydrogen-depleted suspension (4), ethylene and comonomer (9) and a second diluent (24 and 34) to a second polymerization reactor (H) to prepare a second suspension (11) of solid particles of a second ethylene polymer in a second suspension medium, wherein the second diluent (24 and 34) comprises branched heptane and the comonomer dissolved in the second diluent,
d) processing the second suspension (11) to obtain a dry effluent (14) of the solid particles of the second ethylene polymer and a liquid stream (23) comprising branched heptane, the comonomer, and low molecular weight hydrocarbon reaction products,
e) feeding at least part (25) of the liquid stream (23) to a solvent evaporation system (Q) for separating non-volatile, low-molecular-weight hydrocarbon reaction products and subsequently to a distillation column (R) for separating the comonomer from branched heptane to obtain 1) a branched heptane liquid stream essentially free of the comonomer, 2) a vapor distillate (31) comprising the comonomer and branched heptane and 3) a liquid distillate (30) comprising branched heptane and the comonomer,
f) feeding the liquid distillate (30) to the second polymerization reactor (H) to form at least part of the second diluent (34) and
g) feeding the branched heptane liquid stream to the first polymerization reactor as the first diluent (29).

2. The process according to claim 1, wherein a further reactor is connected to upstream of the first polymerization reactor (A) and/or downstream of the second polymerization reactor (H).

3. The process according to claim 1, wherein polymerization in the first polymerization reactor (A) is carried out at pressures of 0.1 to 5 MPa and temperatures of 40° C. to 130° C., and/or polymerization in the second polymerization reactor (H) is carried out at pressures of 0.1 to 5 MPa and temperatures of 40° C. to 130° C.

4. The process according to claim 1, wherein a pressure in the flash drum (E) is lower than 0.1 MPa.

5. The process according to claim 1, wherein an amount of the comonomer in the second diluent (24 and 34) is 1 to 10 wt % of the second diluent.

6. The process according to claim 1, wherein the vapor distillate (31) obtained in step e) is cooled to lower temperatures than those used in the distillation column (R) to recover condensable products, and a vapor distillate condensate (33) obtained from the vapor distillate is fed to the second reactor (H) as part of the second diluent (34).

7. The process according to claim 1, wherein step d) involves
d1) feeding the second suspension (11) to a decanter centrifuge (K) to obtain the liquid stream (23) and a concentrated slurry (13) rich in the solid particles of the second ethylene polymer and
d2) feeding the concentrated slurry (13) to a fluidized bed dryer (L) to obtain the dry effluent (14) of the solid particles of the second ethylene polymer and optionally
d3) feeding the dry effluent (14) from the fluidized bed dryer (L) to a silo (N) for degassing and catalyst neutralization.

8. The process according to claim 1, wherein a part of the liquid stream produced in d1) is fed to the second polymerization reactor (H) without any purification to form part of the second diluent (24).

9. The process according to claim 1, wherein the dry effluent (14) of solid polymer particles obtained after step d3) contains at most 0.2 wt % of branched heptane as determined by gas chromatography.

10. A system for performing the process according to claim 1, wherein the system comprises a series of polymerization reactors, the flash drum, the solvent evaporation system and the distillation column.

* * * * *